Patented Dec. 5, 1939

2,182,436

UNITED STATES PATENT OFFICE 2,182,436

RED LEAD COMPOSITION

James O. Johnstone, East Chicago, Ind., assignor to The Glidden Company, Cleveland, Ohio, a corporation of Ohio No Drawing. Application January 26, 1937, Serial No. 122,425

8 Claims. (Cl. 134—67)

This invention relates to red lead of the type used as a paint pigment, and has particular reference to a new and novel form of red lead characterized by non-reactivity with acid paint vehicle even under adverse conditions.

As is well known, red lead is produced by heating litharge and oxygen at elevated temperatures, but below the decomposition point of red lead (700° F. to 900°) until the litharge is substantially converted to red lead. When the conversion is carried out successfully, substantially all of the litharge has been converted into red lead. There generally remains about 3% to 5% free PbO, the products being known in the trade as 97% and 95% red lead respectively.

In the normal course of events, the litharge is present in the red lead as cores of material in the individual red lead particles, thoroughly surrounded and coated by red lead. Such red leads, when ground into acid paint vehicles, are generally non-reactive; the red lead will not react, and the litharge present is coated with a sufficient quantity of red lead to prevent the free fatty acid of the vehicle from contacting the litharge to form lead soaps, whereby substantial livering of the paint would occur.

Occasionally, however, complaints are received that red lead paints have livered, apparently due to interaction of the litharge and the free fatty acid of the vehicle. This is often attributed to over-grinding in the paint plant, with resultant exposure of the litharge, particularly with the 95% grade. This theory is generally unsound, as red lead paints are scarcely ever subjected to sufficient attrition to break down the pigment particles, the principal function of the mills used being wetting and not reduction of pigment particle size.

The reactivity of 95% and 97% red leads appears to be due to the mechanical inclusion of minute quantities of free litharge, or to somewhat larger (but still small) quantities of less completely converted red lead, in which the litharge core is not completely coated with red lead.

I have discovered that the reactive 95% and 97% red leads can be rendered non-reactive by reacting the free litharge with carbon dioxide, whereby the reactive lead oxide is converted into a non-reactive compound containing $CO_2$ in combination. I have also discovered that this reaction occurs most rapidly in the presence of water, preferably distributed through the red lead mass by reducing the temperature of the air below its dew point.

For example, I took a 20 gallon drum of red lead containing 550 pounds of 95.5% red lead (about 8 gallons volume) which was reactive with acid paint vehicles. This material contained 4.5% litharge (24.75 pounds) sufficient to react with 4.9 pounds of $CO_2$ to form normal lead carbonate, or with 3.24 pounds of $CO_2$ and .67 pound of water to form the conventional white lead. To this drum I added 2 pounds of solid carbon dioxide, and I then closed the drum, but set the seal so that excessive pressure could not develop to burst the drum. After two days, samples from the drum indicated that .86 pound of $CO_2$ had been absorbed, or less than ⅕ necessary to convert all of the litharge. The treated red lead, however, was not reactive with an acid fish oil vehicle, which livered rapidly with the untreated product. The reactive litharge was apparently less than 20% of the litharge content, the residue apparently being sufficiently protected by the red lead.

As another example of my invention, I placed a reactive red lead in a rotating drum, and passed cooled flue gases through the drum at room temperature. Two hours' treatment converted the reactive red lead into a non-reactive form. The $CO_2$ absorption was about the same as in the previous example.

The resultant product, which I consider new, comprises true red lead, litharge coated with red lead, and a very minor proportion of a non-reactive lead carbonate whose exact constitution is unknown, but which is non-reactive with acid paint vehicles.

While I have shown two methods of carbonating, other methods can be employed. For example, the red lead can be exposed to flue gas during the milling operation. The essential in carbonation is that the temperature be kept fairly low, and the presence of moisture appears to hasten the reaction.

Red leads containing substantially more free litharge than the 95% grade can likewise be successfully carbonated by my process; but it is far more economical to oxidize to a higher red lead content. Economically, it is not feasible to carbonate lower than 90% red lead.

I consider my invention to reside in the discovery that reactive red lead can be rendered non-livering with acid paint vehicles by carbonation of the active litharge content.

I claim:

1. The method of rendering a livering red lead substantially non-livering with acid paint vehicles, comprising subjecting the livering red lead to the action of carbon dioxide to convert active litharge present into non-reactive lead carbonates.

2. The method of rendering a livering red lead substantially non-livering with acid paint vehicles, comprising intermixing the red lead with solid carbon dioxide, and maintaining contact between the red lead and $CO_2$ until the reactive litharge present has been converted into non-reactive lead carbonates.

3. The method of rendering a livering red lead substantially non-livering with acid paint vehicles comprising treating the red lead with carbon dioxide for a time sufficient to change the active litharge present in the composition into non-reactive lead carbonates.

4. The method of rendering a livering red lead substantially non-livering with acid paint vehicles comprising treating the red lead with carbon dioxide under dry conditions for a time sufficient to change the reactive litharge present in the composition into non-reactive lead carbonates.

5. The process of rendering a livering red lead substantially non-livering with acid paint vehicles which comprises treating the red lead with carbon dioxide under pressure in excess of atmospheric for a time sufficient to change the reactive litharge present into non-reactive lead carbonates.

6. The process of rendering a livering red lead non-livering with acid paint vehicles which comprises treating red lead with carbon dioxide in the presence of moisture for a time sufficient to change the reactive litharge present into non-reactive lead carbonates.

7. The method of rendering a livering red lead substantially non-livering with acid paint vehicles which comprises treating the red lead with carbon dioxide at room temperature for a time sufficient to change the reactive litharge present in the composition into non-reactive lead carbonates.

8. The method of rendering a livering red lead substantially non-livering with acid paint vehicles which comprises treating the red lead with carbon dioxide in air at a temperature below the dew point of the air, and for a time sufficient to change the reactive litharge present in the composition into non-reactive lead carbonates.

JAMES O. JOHNSTONE.